(12) United States Patent
Schweidel et al.

(10) Patent No.: US 12,168,458 B2
(45) Date of Patent: Dec. 17, 2024

(54) SYSTEMS AND METHODS FOR MANEUVERING VEHICLES USING PREDICTIVE CONTROL AND AUTOMATED DRIVING

(71) Applicant: Toyota Research Institute, Inc., Los Altos, CA (US)

(72) Inventors: Katherine Steele Schweidel, Berkeley, CA (US); Miroslav Baric, San Jose, CA (US); Sarah Koehler, San Jose, CA (US); Vishnu R. Desaraju, Ann Arbor, MI (US); Matthew Brown, Palo Alto, CA (US); Timothee Jean William Cazenave, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 330 days.

(21) Appl. No.: 17/717,416

(22) Filed: Apr. 11, 2022

(65) Prior Publication Data

US 2023/0141801 A1 May 11, 2023

Related U.S. Application Data

(60) Provisional application No. 63/276,164, filed on Nov. 5, 2021.

(51) Int. Cl.
*B60W 60/00* (2020.01)
*B60W 50/08* (2020.01)

(52) U.S. Cl.
CPC ........ *B60W 60/0015* (2020.02); *B60W 50/08* (2013.01); *B60W 60/0013* (2020.02); *B60W 60/0027* (2020.02)

(58) Field of Classification Search
CPC ............ B60W 60/0015; B60W 50/08; B60W 60/0027; B60W 50/087
See application file for complete search history.

(56) References Cited

U.S. PATENT DOCUMENTS

| 10,955,842 B2 | 3/2021 | Zeng et al. | |
| 2012/0083947 A1* | 4/2012 | Anderson | .............. G08G 1/166 |
| | | | 701/1 |

(Continued)

OTHER PUBLICATIONS

Alsterda et al., "Contingency Model Predictive Control for Linear Time-Varying Systems," IEEE Transactions on Control Systems Technology, Feb. 27, 2021, pp. 1-12.

(Continued)

*Primary Examiner* — Ryan Rink
(74) *Attorney, Agent, or Firm* — Christopher G. Darrow; Darrow Mustafa PC (57) ABSTRACT

System, methods, and other embodiments described herein relate to vehicle maneuvering using predictive control with automated driving and contingency planning to preserve safety and increase comfort. In one embodiment, a method includes receiving, by a controller, an operator command associated with a vehicle maneuver while automated driving is engaged. The method also includes adjusting a motion command associated with the vehicle maneuver by applying a predictive control according to motion estimates outputted from the automated driving and the operator command, the predictive control using motion constraints that are constant between time intervals for the vehicle maneuver. The method also includes controlling, by the controller, a vehicle using the motion command for a time step during the time intervals.

20 Claims, 5 Drawing Sheets

(56) References Cited

U.S. PATENT DOCUMENTS

| | | | |
|---|---|---|---|
| 2019/0113920 A1 | 4/2019 | Englard et al. | |
| 2020/0216085 A1* | 7/2020 | Bobier-Tiu | B60W 40/08 |
| 2020/0216090 A1* | 7/2020 | Zaseck | G06V 20/56 |
| 2020/0307691 A1 | 10/2020 | Kalabic et al. | |
| 2021/0031760 A1* | 2/2021 | Ostafew | G05D 1/0088 |
| 2021/0139026 A1* | 5/2021 | Phan | G08G 1/0968 |
| 2022/0017103 A1* | 1/2022 | Koehler | G05B 13/047 |
| 2022/0194419 A1* | 6/2022 | Houshmand | B60W 60/0023 |
| 2022/0234614 A1* | 7/2022 | Frazzoli | B60W 30/143 |

OTHER PUBLICATIONS

Hardy et al., "Contingency Planning over Probabilistic Hybrid Obstacle Predictions for Autonomous Road Vehicles," 2010 IEEE/RSJ International Conference on Intelligent Robots and Systems, 2010, pp. 2237-2242.

Alsterda et al., "Contingency Model Predictive Control for Automated Vehicles," 2019 American Control Conference (ACC), Mar. 2019, pp. 717-722.

Beal et al., "Model predictive control for vehicle stabilization at the limits of handling," IEEE Transactions on Control Systems Technology, vol. 21, No. 4, Jul. 2013, pp. 1258-1269.

Erlien et al., "Shared steering control using safe envelopes for obstacle avoidance and vehicle stability," IEEE Transactions on Intelligent Transportation Systems, vol. 17, No. 2, 2016, pp. 1-11.

Manfred Morari "Predictive Control for Linear and Hybrid Systems," Cambridge University Press, 2017, 187 pages.

Kyriakidis et al., "The Deployment of Advanced Driver Assistance Systems in Europe," 22nd ITS World Congress, Oct. 2015, pp. 1-26.

Reagan et al., "Crash avoidance and driver assistance technologies—are they used?," Transportation Research Part F: Traffic Psychology and Behaviour, vol. 52, 2018, pp. 176-190.

Marcano et al., "A review of shared control for automated vehicles: Theory and applications," IEEE Transactions on Human-Machine Systems, vol. 50, No. 6, 2020, pp. 475-491.

Bobier et al., "Staying within the nullcline boundary for vehicle envelope control using a sliding surface," Vehicle System Dynamics, vol. 51, No. 2, 2013, pp. 199-217.

Lefevre et al., "A learning-based framework for velocity control in autonomous driving," IEEE Transactions on Automation Science and Engineering, vol. 13, No. 1, 2016, pp. 32-42.

Herceg et al., "Multiparametric toolbox 3.0," in 2013 European Control Conference (ECC), pp. 502-510.

Smith et al., "Monotonicity-based symbolic control for safety in driving scenarios," IEEE Control Systems Letters, vol. 6, 2022, pp. 830-835.

Treiber et al., "Congested traffic states in empirical observations and microscopic simulations," Phys. Rev. E, vol. 62, Aug. 2020, pp. 1805-1824.

Dunning et al., "JuMP: A modeling language for mathematical optimization," SIAM Review, vol. 59, No. 2, 2017, pp. 295-320.

Wachter et al., "On the implementation of an interiorpoint filter line-search algorithm for large-scale nonlinear programming," Mathematical Programming, vol. 106, No. 1, 2006, pp. 25-57.

* cited by examiner

SYSTEMS AND METHODS FOR MANEUVERING VEHICLES USING PREDICTIVE CONTROL AND AUTOMATED DRIVING

CROSS-REFERENCE TO RELATED APPLICATIONS

This application claims benefit of U.S. Provisional Application No. 63/276,164, filed on Nov. 5, 2021, which is herein incorporated by reference in its entirety.

TECHNICAL FIELD

The subject matter described herein relates, in general, to maneuvering vehicles using automation, and, more particularly, to using predictive control and automated driving for adjusting operator commands according to motion estimates and contingency plans of a vehicle.

BACKGROUND

Systems in a vehicle use controllers to implement automated maneuvers. The controllers may receive operator commands through the steering wheel or pedals and interface with electro-mechanical systems while operating to alter vehicle dynamics of the maneuver. For example, an electro-mechanical system adapts an operator command received by an input controller. In one approach, an anti-lock brake system (ABS) adapts a braking input by an operator to pulsations of the brake pads so that the vehicle maintains traction in a maneuver. However, ABS and similar systems provide limited support for the operator, especially during certain unsafe conditions.

Moreover, vehicles augment safety by an ABS and similar systems through automated driving systems (ADS) that initiate safety tasks, such as by sharing control with the operator for safer or smoother operation. For example, blind-spot monitoring, lane-keeping, and automatic braking intervene with a maneuver during normal or dangerous situations. However, these systems are often disabled by operators because of frequent false positives that cause undesirable and sometimes unsafe motion. As such, a vehicle using an ADS to intervene with safety tasks aggressively reduces perceived operator control, thereby impacting safety and operator enjoyment.

SUMMARY

In one embodiment, example systems and methods relate to a manner of improving vehicle maneuvering using predictive control with automated driving and contingency planning to preserve safety and comfort. In various implementations, systems that share control of a vehicle are disabled due to unexpected motion during a maneuver. As one example, a lane-keeping system can maneuver a vehicle back into a lane when an operator is actually attempting to change lanes. This is a false-positive that may create an unsafe condition for the vehicle and startle the operator. The action may also encourage an operator to disengage the ADS, thereby reducing ADS adoption. Therefore, in one embodiment, a control system adjusts a motion command from predicted operator inputs and generates trajectories that reduce false positives while maintaining safety during a maneuver (e.g., vehicle-following). In particular, the control system smoothly intervenes (i.e., limiting abruptions, hard maneuvers, etc.) by maintaining a nominal and a contingency trajectory and applying a command accordingly during operator involvement with a maneuver to preserve safety. For example, the contingency trajectory is a maneuver that preserves safety throughout a contingency event, such as hard braking by a vehicle ahead. In one approach, the control system generates a nominal trajectory (e.g., expected operator maneuver absent the contingency event) involving minimal intervention along with the contingency trajectory using the ADS to adjust the motion command. Expected maneuvers also factor the operator command when adjusting the motion command. In this way, the control system improves operator experience by reducing conservative control from the ADS selectively using the contingency trajectory or applying the operator command while preserving safety.

In various implementations, the control system also uses a cost function for the predictive control. Here, a discrete-time model, differential equation, or machine learning model may be used for the predictive control to estimate future commands by the operator. In one approach, the cost function involves weighted deviations from the operator command and predicted trajectories for a maneuver that is used to adjust the motion command. Furthermore, the control system may also use a terminal set of constraints that provides smoother intervention along a maneuver between time steps within a safety margin (e.g., a defined vehicle separation), such as by factoring the contingency trajectory. In this way, the control system effectively simulates operator control using predictions and the cost function while maintaining safety, thereby improving operator adoption of the ADS through smoother control.

In one embodiment, a control system for improving vehicle maneuvering using predictive control with automated driving and contingency planning to preserve safety and increase comfort is disclosed. The control system includes a processor and a memory storing instructions that, when executed by the processor, cause the processor to receive, by a controller, an operator command associated with a vehicle maneuver while automated driving is engaged. The instructions also include instructions to adjust a motion command associated with the vehicle maneuver by applying a predictive control according to motion estimates outputted from the automated driving and the operator command, the predictive control using motion constraints that are constant between time intervals for the vehicle maneuver. The instructions also include instructions to control, by the controller, the vehicle using the motion command for a time step during the time intervals.

In one embodiment, a non-transitory computer-readable medium for vehicle maneuvering using predictive control with automated driving and contingency planning and including instructions that when executed by a processor cause the processor to perform one or more functions is disclosed. The instructions include instructions to receive, by a controller, an operator command associated with a vehicle maneuver while automated driving is engaged. The instructions also include instructions to adjust a motion command associated with the vehicle maneuver by applying a predictive control according to motion estimates outputted from the automated driving and the operator command, the predictive control using motion constraints that are constant between time intervals for the vehicle maneuver. The instructions also include instructions to control, by the controller, the vehicle using the motion command for a time step during the time intervals.

In one embodiment, a method for vehicle maneuvering using predictive control with automated driving and contingency planning to preserve safety and increase comfort is disclosed. In one embodiment, the method includes receiving, by a controller, an operator command associated with a vehicle maneuver while automated driving is engaged. The method also includes adjusting a motion command associated with the vehicle maneuver by applying a predictive control according to motion estimates outputted from the automated driving and the operator command, the predictive control using motion constraints that are constant between time intervals for the vehicle maneuver. The method also includes controlling, by the controller, a vehicle using the motion command for a time step during the time intervals.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed herein associated with improving vehicle maneuvering using predictive control with automated driving and contingency planning to preserve safety and increase comfort. In various implementations, a vehicle may disable features of an automated driving system (ADS) as commanded by an operator due to erratic motion. For example, a lane-keeping system can maneuver a vehicle back into a lane as a false-positive when an operator is actually attempting to change lanes. This response by the vehicle may create an unsafe condition for the vehicle and startle the operator. The action may also reduce ADS adoption as operator confidence reduces. Therefore, in one embodiment, a control system computes nominal and contingency trajectories using predictive control while a vehicle has the ADS engaged such that operator confidence over control is improved while maintaining safety. The nominal trajectory involves minimal intervention by the ADS through the predictive control since the contingency event is unlikely, whereas the contingency trajectory involves perceptible intervention for avoiding a contingency event (e.g., hard braking by a vehicle ahead). In one approach, the control system receives an operator command (e.g., maneuver 15 degrees left) where the predictive control generates an adjusted motion command that is similar (e.g., maneuver 16 degrees left) when safe for a maneuver instead of other actions. Here, the control system may avoid direct intervention through the nominal or contingency trajectories. Furthermore, the control system may use a terminal set of motion constraints (e.g., allowed steering degrees, limited deceleration, etc.), such as to maintain the motion command within a safety margin (e.g., defined following distance) for stability between time steps. Using a terminal set may improve the balance between smoothness and ADS intervention. In other words, the predictive control may use motion constraints that are constant between time intervals to optimize and modulate control.

In various implementations, the control system determines the nominal and contingency trajectories using a model for predictive control with motion estimates from the ADS for a maneuver associated with the operator command. For example, the maneuver may involve safely following a vehicle in traffic or crossing an intersection. In addition, the contingency trajectory involves factoring actions by surrounding vehicles, such as braking or acceleration during vehicle-following, that decreases the safety margin of the maneuver. As such, the control system may implement the contingency trajectory to increase the safety margin of the maneuver. Otherwise, the nominal trajectory may be similar to the contingency trajectory when the safety margin satisfies the model for control. Accordingly, the control system improves safety and operator confidence through predictive control while an ADS is engaged by incorporating nominal and contingency trajectories to vehicle maneuvering.

Figure 1:
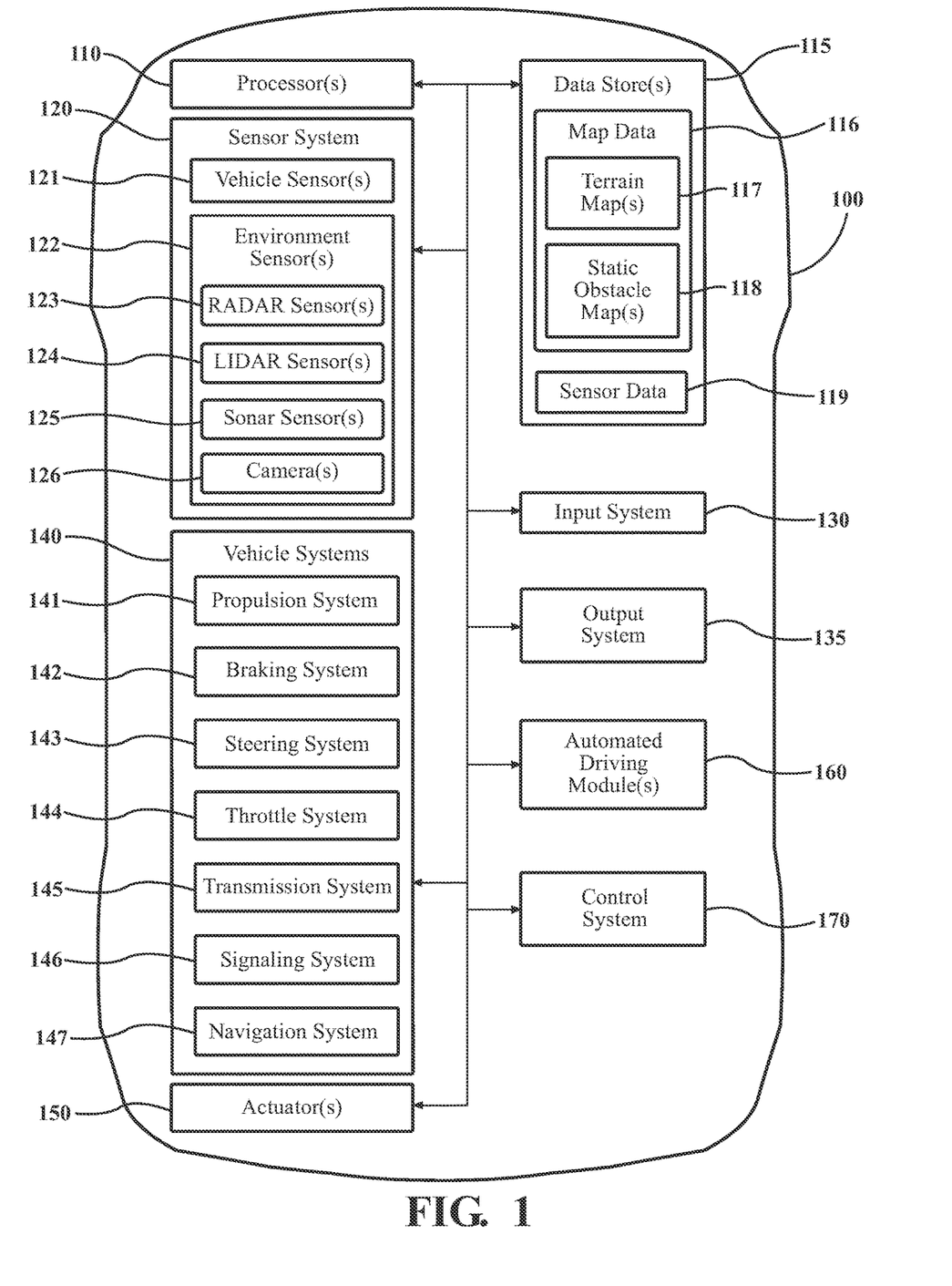
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100. Furthermore, the environment or surroundings of the vehicle 100 can include pedestrians, bicyclists, animals, and so on.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a control system 170 that is implemented to perform methods and other functions as disclosed herein relating to improving vehicle maneuvering using predictive control with automated driving and contingency planning to preserve safety and smoothness by predicting operator inputs and factoring actions of surrounding vehicles.

Figure 2:
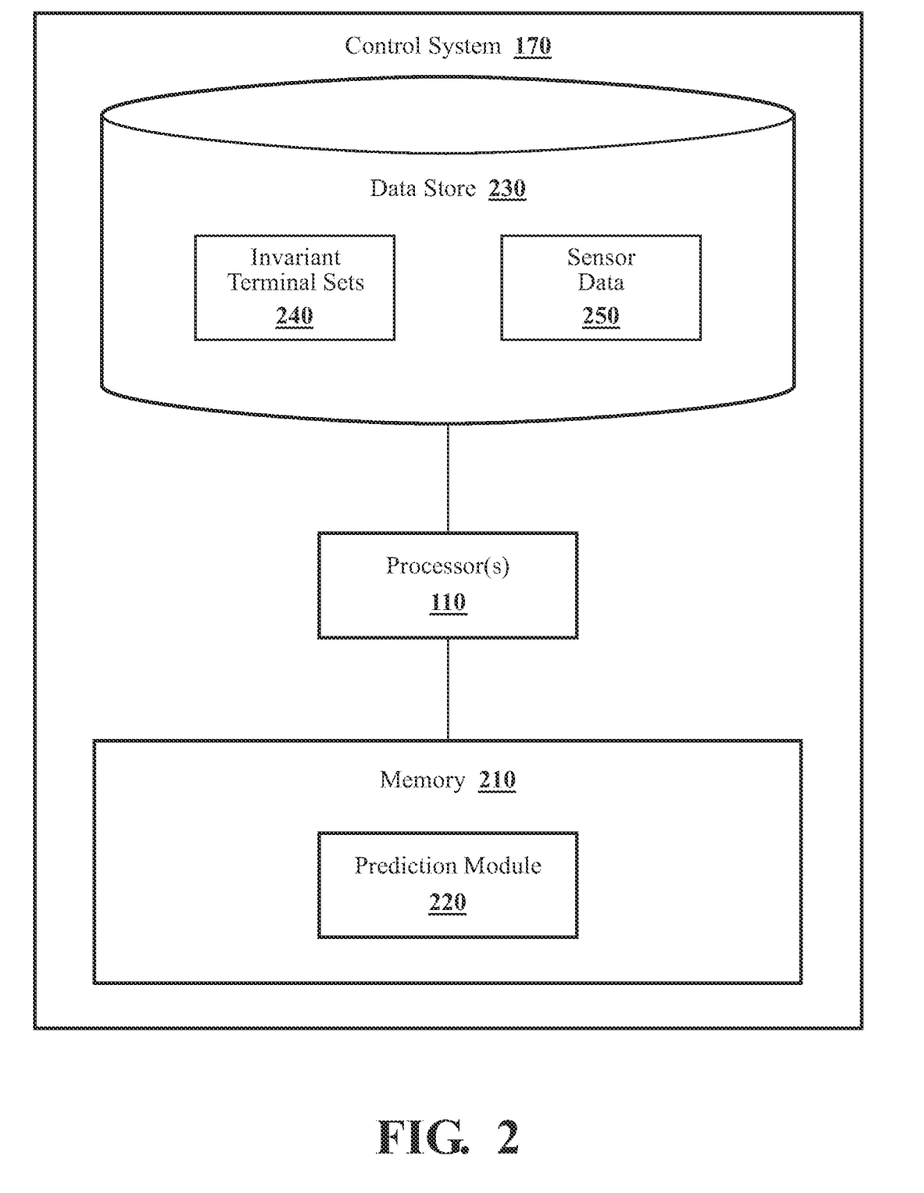
FIG. 2 illustrates one embodiment of a control system that is associated with maneuvering a vehicle using predictive control with automated driving and contingency planning.

With reference to FIG. 2, one embodiment of the control system 170 of FIG. 1 is further illustrated. The control system 170 is shown as including a processor(s) 110 from the vehicle 100 of FIG. 1. Accordingly, the processor(s) 110 may be a part of the control system 170, the control system 170 may include a separate processor from the processor(s) 110 of the vehicle 100, or the control system 170 may access the processor(s) 110 through a data bus or another communication path. In one embodiment, the control system 170 includes a memory 210 that stores a prediction module 220. The memory 210 is a random-access memory (RAM), a read-only memory (ROM), a hard-disk drive, a flash memory, or other suitable memory for storing the prediction module 220. The prediction module 220 is, for example, computer-readable instructions that when executed by the processor(s) 110 cause the processor(s) 110 to perform the various functions disclosed herein.

The control system 170 as illustrated in FIG. 2 is generally an abstracted form of the control system 170 as may be implemented between the vehicle 100. Furthermore, the prediction module 220 generally includes instructions that function to control the processor(s) 110 to receive data inputs from one or more sensors of the vehicle 100. The inputs are, in one embodiment, distance measurements or observations about surrounding vehicles. As provided for herein, the prediction module 220, in one embodiment, acquires the sensor data 250 from radar 123, LIDAR sensors 124, and other sensors as may be suitable for identifying vehicles and locations of the vehicles ahead or at an intersection.

Moreover, in one embodiment, the control system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the prediction module 220 in executing various functions. In one embodiment, the data store 230 includes the sensor data 250 along with the invariant terminal sets 240. Here, the invariant terminal sets 240 represent motion constraints related to vehicle/environmental state (e.g., crossing an intersection, vehicle-following, ado velocity, ado position, etc.) at time t. A terminal set is invariant during a state when properties persist during time steps. In other words, as explained below, the vehicle 100 can use a terminal set between multiple time steps in a model for predictive control that limits abruptions and enhances smoothness.

Figure 3:
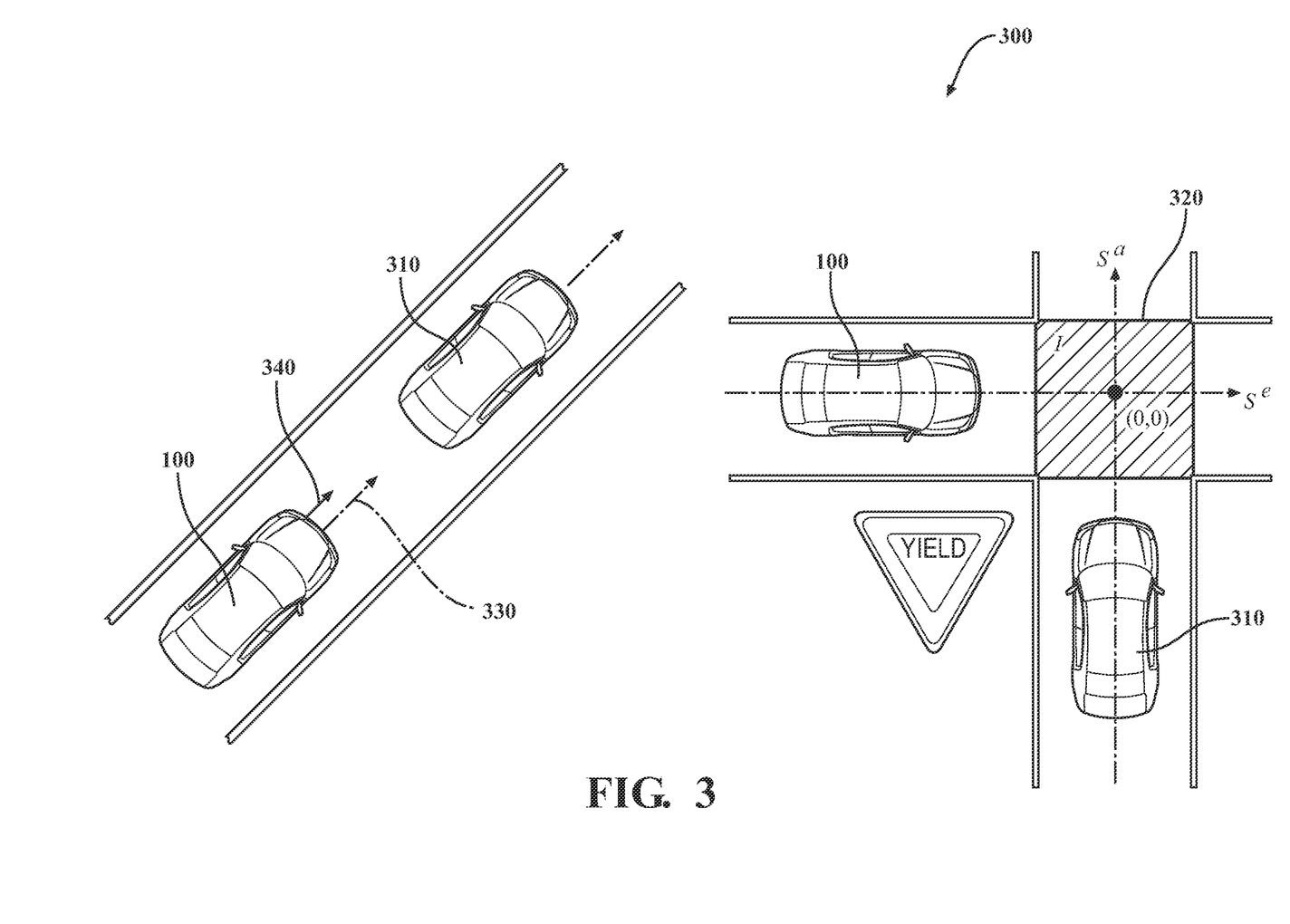
FIG. 3 illustrates one embodiment of the control system of FIG. 2 to implement predictive control and automated driving for adjusting motion commands during various vehicle states.

Now turning to FIG. 3, one embodiment of the control system 170 of FIG. 2 is illustrated. The control system 170 may implement predictive control and automated driving for adjusting motion commands during various vehicle states 300. Here, the prediction module 220 includes instructions that cause the processor 110 to implement contingency planning through an ADS so that a safety margin is maintained according to operator commands. A safety margin can relate to a contingency event (e.g., a rear-end or cross-traffic collision) and a breach of the safety margin triggers a safety maneuver (e.g., lateral maneuver, emergency braking, etc.) by the vehicle 100. The contingency planning is also implemented by the prediction module 220 to moderate conservatism for avoiding frequent intervention.

In one approach, the control system 170 uses contingency planning with model predictive control (CMPC) such that a solution to a MPC problem preserves the safety margin for a trajectory. CMPC can derive a solution for system intervention through an optimization problem for a dynamic model (e.g., differential equations, a neural network, etc.). As explained below, CMPC involves computing a nominal trajectory 330 and a contingency trajectory 340 based on an operator command and adjusting a motion command accordingly. In particular, the contingency trajectory 340 assumes that the contingency event takes place as a constraint for the model and may involve likely ADS intervention with a maneuver. On the contrary, the nominal trajectory assumes that the contingency event does not take place and predicts an operator maneuver that may resemble a trajectory from following the operator command. For the examples given herein, the control system 170 coordinates with the CMPC of the ADS to adjust the motion command for improved smoothness and comfortable intervention of the vehicle 100.

For FIG. 3, the vehicle 100 follows the ado vehicle 310 in a first vehicle state. In another scenario, the vehicle 100 and the ado vehicle 310 approach an intersection state 320. The control system 170 computes the nominal and contingency trajectories for various vehicle states. For example, the vehicle 100 follows the nominal trajectory 330 that represents mostly continuing a maneuver with a low probability of a contingency event while a safety margin with the ado vehicle 310 is maintained. However, as explained below, the vehicle 100 executes a motion command to follow the contingency trajectory 340 when a safety margin breach is projected by the predictive control. In one approach, the vehicle 100 uses the sensor data 250 to determine that the ado vehicle 310 breached the safety margin, such as by sudden braking representing a contingency event. In this way, the vehicle 100 may avoid a dangerous scenario with the ado vehicle 310 through the contingency trajectory 340.

Forthcoming are Equations (1)-(14) that the control system 170 may utilize to implement predictive control within an ADS and contingency planning. As previously explained, the vehicle 100 following the nominal trajectory 330 or the contingency trajectory 340 in a driving scenario may factor the invariant terminal sets 240 to improve comfort and confidence. The driving scenario can involve a system $x_{k+1}=f(x_k, u_k)$ with state constraints $x_k \in \mathcal{X} \subseteq \mathbb{R}^n$ and input constraints (e.g., operator commands) $u_k \in \mathcal{U} \subseteq \mathbb{R}^m$. Here, $\mathcal{X}$ is a set of state constraints. For example, if the model states are position and speed, then the constraints could be to stay within a speed limit (v<=v_max). The parameter m is the number of control inputs or actions for modeling. For example, m can be 1 when representing the acceleration command that the controller can output. However, m could be 2 to include both acceleration and steering. Furthermore, A is a state update matrix of the linear time-invariant (LTI) system.

In various implementations, the control system 170 factors a backward reachable set (BRS) and a maximum control invariant set (MCIS). The K-step BRS from S, denoted $\mathcal{B}$ (S, $\mathcal{K}$) is the set of states that can be driven to S in K steps while maintaining state and input constraints. As such, the control system 170 can compute BRS by recursively applying the one-step backward reachable set defined as:

$$\text{Pre}(S) = \{x \in \mathcal{X} : \exists u \in \mathcal{U} \text{ s.t. } f(x,u) \in S\}. \quad \text{Equation (1)}$$

Initializing the recursion with $\mathcal{B}$ (S, 0)=S gives:

$$B(S,k) = \text{Pre}(B(S,k-1)), \, k=1, \ldots, K. \quad \text{Equation (2)}$$

Here, the set depends implicitly on f, $\mathcal{X}$, and $\mathcal{U}$.

Moreover, a non-empty set $\mathcal{C} \subseteq \mathcal{X}$ is a control invariant set for MCIS when satisfying the relation $\mathcal{C} \subseteq \text{Pre}(\mathcal{C})$. Then the MCIS, denoted, $\mathcal{C}^{max}(\mathcal{X})$ is the largest control invariant set within $\mathcal{X}$. In other words, $\mathcal{C}^{max}(\mathcal{X})$ is the largest subset of $\mathcal{X}$ that the system can be controlled to remain within for each time step of a time interval associated with a maneuver or a trajectory. The control system 170 applying BRS or MCIS for adjusting a motion command is given for the vehicle-following and intersection crossing examples below. However, BRS or MCIS may be applied to construct the invariant terminal sets 240 for any driving scenarios where the control system 170 utilizes predictive control during automated driving to enhance comfort and safety.

Besides invariant terminal sets, the control system 170 also uses a cost function that factors comfort, fuel-efficiency, path-following, time-optimality, etc. Here, a cost function quantifies various candidate trajectories for the vehicle 100. In one approach, the CMPC prioritizes matching an operator command where an operator is in the loop for controlling the vehicle 100 in association with the cost function. As such, the cost function can be a weighted sum of deviations from the operator command and predicted trajectories from the ADS for determining a motion command as follows:

$$\min_{\substack{u_0^n, \ldots, u_{N-1}^n \\ u_0^c, \ldots, u_{N-1}^c}} (1 - P_c) \sum_{k=0}^{N-1} (u_k^n - u_k^{n,c})^2 + P_c \sum_{k=0}^{N-1} (u_k^c - u_k^{d,c})^2. \quad \text{Equation (3a)}$$

Here, the control system 170 uses a model that computes predicted inputs of an operator, which may differ along the nominal trajectory 330 and the contingency trajectory 340, and determines a motion command for execution by the vehicle 100.

Regarding more details on determining and factoring the invariant terminal sets 240, the control system 170 can use a LTI system as $\varepsilon_{k+1} = A \varepsilon_k + B u_k$ to express longitudinal scenarios (e.g., vehicle-following, intersection crossing, etc.) using terminal set Z. Here, a constraint $u_0^n = u_0^c$ involves sharing a common input for the nominal trajectory 330 or contingency trajectory 340 computations. In one approach, a shared segment extended between the trajectories represented by $u_i^n = u_i^c$, $i=1, \ldots, N_{trajectory}$ is also utilized. For the computations, at each time step k, online optimization of a motion command for a maneuver may involve Equation 3 (a) and follow:

$$\text{s.t. } \xi_{k+1}^n = A\xi_k^n + Bu_k^n; \quad \text{Equation (3b)}$$

$$\xi_{k+1}^c = A\xi_k^c + Bu_k^c; \quad \text{Equation (3c)}$$

$$h_k^n(\xi_k^n, u_k^n) \le 0; \quad \text{Equation (3d)}$$

$$h_k^c(\xi_k^c, u_k^c) \le 0; \quad \text{Equation (3e)}$$

$$\xi_N^c \in \mathcal{Z}; \quad \text{Equation (3f)}$$

$$u_0^n = u_0^c; \text{ and} \quad \text{Equation (3g)}$$

$$\xi_0^n = \xi_0^c = \xi(t). \quad \text{Equation (3h)}$$

In these equations, $i \in \{n, c\}$ represent the nominal trajectory 330 and the contingency trajectory 340, respectively, $u_k^i$ is the control system 170 input associated with the motion command, $u_k^{d,i}$ is the current or predicted input for an operator, $\xi_k^i$ is the vehicle state, and $h_k^i$ functionally represents state and input constraints, and $x_t(t)$ is the current vehicle state. Furthermore, $P_c$ represents the likelihood of a contingency event (e.g., hard braking) provided a priori, such as through an inference operation by the ADS. Also, the control system 170 may pre-calculate $u_k^{d,n}$ and $u_k^{d,c}$ for time step k+1.

In various implementations, the control system 170 uses expressions for the motion dynamics of the vehicle 100 or the ado vehicle 310 along a longitudinal displacement s by a double integrator model with velocity v and acceleration constraints and adjusts motion commands accordingly. As such, the vehicle dynamics and constraints for acceleration u and the vehicle state $\xi = [s; v]$ may be:

$$\dot{s} = v, \, \dot{v} = u, \, 0 \le v \le v_{max}, \, a_{min} \le u \le a_{max}. \quad \text{Equation (4)}$$

The control system 170 may discretize this model using a zero hold for each time step:

$$\xi_{k+1} = \underbrace{\begin{bmatrix} 1 & T \\ 0 & 1 \end{bmatrix}}_{=:A} \xi_k + \underbrace{\begin{bmatrix} \frac{1}{2}T^2 \\ T \end{bmatrix}}_{=:B} u_k, \quad \text{Equation (5)}$$

where T is the discretization time step. Furthermore, constraints polytopes X and U can be defined as:

$$\xi_k \in \mathcal{X} \Leftrightarrow 0 \le [0 \; 1]\xi_k \le v_{max}; \text{ and} \quad \text{Equation (6)}$$

$$u_k \in \mathcal{U} \Leftrightarrow a_{min} \le u_k \le a_{max}. \quad \text{Equation (7)}$$

Regarding intervention, the control system 170 adjusts a motion command if a current or predicted operator command is unsafe relative to a safety margin (e.g., a defined vehicle separation). Otherwise, a minimum zero cost is obtained by matching a current command by applying $u_0^n = u_0^c = u_0^d$ while maintaining safety constraints or margins. Similarly, the control system 170 matches a predicted command through $u_k^n = u_k^{d,n}$ and $u_k^c = u_k^{d,c}$, k=1, . . . , N−1.

In various implementations, the control system 170 varies $P_c$ and N to optimize intervention. For example, a higher weight is placed on the cost of the contingency trajectory 340 with an increasing $P_c$ representing that a contingency event may be likely. As a result, the control system 170 takes preventative action sooner (e.g., via $u_0^c$) that prevents abrupt interventions further along the contingency trajectory 340. Hence, a trade-off exists between smooth intervention by the control system 170 when the contingency event occurs and minimal controller intervention when the contingency event does not occur. For example, when $P_c=0$ few terms in the cost function exist for the controller to take preventative action and smooth the intervention. For this $P_c$ value, the controller waits a maximum time before intervening and then intervenes most abruptly. Furthermore, smoother intervention (e.g., for $P_c=1$) may be undetectable by the operator. The cost of smooth intervention occurs when the contingency event does not occur. Accordingly, the control system 170 can adjust the trade-off by tuning the parameter $P_c$ based on the likelihood of the contingency event occurring and the preferences of an operator.

Intervention can also be adjusted by increasing N. This causes the control system 170 to intervene sooner for predicted inputs that are unsafe, thereby avoiding abrupt and high-cost deviations from the operator command. For the case N=1, the control system 170 executes the operator command or nearest motion command with limited adjustments as safety margins are met through various scenarios. Here, the control system 170 smoothens future intervention through limited preventive action.

Now addressing vehicle scenarios in detail, the vehicle states 300 may include vehicle-following where the vehicle 100 follows motion commands while remaining within a safety margin from the ado vehicle 310. Here, the safety margin is satisfied at various times even if the ado vehicle 310 applies maximum braking. Thus, the control system 170 may treat maximum braking as a contingency event and model vehicle-following as double integrators with discrete-time dynamics using Equation (5). For modeling, the superscript $i \in \{e, a\}$ represents the vehicle 100 and the ado vehicle 310, respectively, and $\xi_k^e$ is the vehicle 100 at the kth time step.

Moreover, the control system 170 may utilize state constraints at each time step of the prediction horizon for vehicle-following, thereby ensuring that the vehicle 100 remains a set distance d behind the ado vehicle 310. This is represented by $s_k^e \leq s_k^a - d$. Constraints for the nominal trajectory 330 may follow Equation 3(d) and the ado vehicle 310 position $s_k^a$ is propagated assuming maintenance of the current speed. Constraints for the contingency trajectory 340 may follow Equation 3(c) and position $s_k^a$ is propagated assuming maximum braking by the ado vehicle 310.

Regarding other constraints for vehicle-following, the control system 170 may compute a terminal set offline as a constant parameter. The computations may be performed offline using polytopes as explained below. A polytope is the convex hull of finite points in a Euclidean space. In vehicle-following, the MCIS may represent a set of states such that the vehicle 100 can stop behind a still ado vehicle 310 as follows:

$$S = C^{max}(\{[\xi^e; \xi^a]: s^e \leq s^a - d, v^a = 0\})|_{u^a=0}.\quad\text{Equation (8)}$$

Here, the BRS is computed using Equation (9) for the (F−N)-step from this set assuming the ado vehicle 310 applies maximum braking. In particular, F is the minimum number of time steps in which the ado vehicle 310 can come to a stop.

$$Q = \begin{cases} B(S, F-N)|_{u^a=u^a_{min}}, & F > N \\ S, & \text{else} \end{cases}\quad\text{Equation (9)}$$

For maximum braking, $\xi^a$ can represent the worst-case state of the ado vehicle 310 at the end of the horizon. In other words, the ado vehicle 310 applies maximum braking until coming to a stop when possible. As such, slice Q at $\xi^a$ involves:

$$\mathcal{Z} = \{\xi^e: [\xi^e; \bar{\xi}^a] \in Q\}.\quad\text{Equation (10)}$$

Turning to detailed operations of the intersection state 320, the vehicle 100 and the ado vehicle 310 both converge upon a point but the ado vehicle 310 may have the right of way. Here, the control system 170 may utilize a safety margin or constraint that the two vehicles do not simultaneously occupy the intersection. Thus, the control system 170 determines whether to stop the vehicle 100 through adjusted motion commands before the intersection and wait for the ado vehicle 310, or safely exit the intersection before the ado vehicle 310. Here, the contingency event may be maximum acceleration by the ado vehicle 310. Furthermore, the motion of both vehicles is modeled as double integrators with dynamics as in Eq. (5), where $s^e$ and $s^a$ represent the positions along straight-line paths. The $s^e=s^a=0$ point is where the paths cross in the center of the intersection for the vehicles. As such, the interaction set to be avoided becomes:

$$I = \{\xi^e, \xi^a: |s^e| \leq l \text{ and } |s^a| \leq l\}.\quad\text{Equation (11)}$$

where l is half the width of an intersection.

Turning again to terminal sets, the control system 170 avoids the interaction set I by ensuring that the vehicle 100 can either wait for the ado vehicle 310 to pass through the intersection, or can successfully go through the intersection before the ado vehicle 310 enters. Hence, two invariant sets $\mathcal{Z}_{wait}$ and $\mathcal{Z}_{go}$ are constructed and the terminal set constraint involves:

$$\xi_N^e \in \mathcal{Z}_{wait} \cup \mathcal{Z}_{go}.\quad\text{Equation (12)}$$

Here, $\mathcal{Z}_{wait}$ may be an invariant set ensuring that the vehicle 100 can wait and let the ado vehicle 310 pass first. In other words, this is the set of the vehicle 100 states stopping or reducing speed before the beginning of the intersection $s^e=-l$. In one approach, this set is computed as:

$$\mathcal{Z}_{wait} = C^{max}(\{\xi^e: s^e \leq -l\}).\quad\text{Equation (13)}$$

For Equation (12), computations by the control system 170 may involve solving a wait optimization problem with the terminal constraint $\xi_N^e \in \mathcal{Z}_{wait}$ and a go optimization problem with the terminal constraint $\xi_N^e \in \mathcal{Z}_{go}$. The results of these operations may be taken to the optimization problem that yields the lower cost. In one approach, the control system 170 also biases towards waiting or going by weighting the cost functions of the optimizations differently to improve operator confidence over control of the vehicle 100.

Moreover, $\mathcal{Z}_{go}$ may be a set of vehicle 100 states such that the vehicle 100 can exit the intersection before entry by the ado vehicle 310. Here, the control system 170 computes F representing the minimum number of time steps in which the ado vehicle 310 can possibly enter the intersection subject to speed and acceleration constraints. If F>N, i.e., the ado vehicle 310 may be unable to stop during the current prediction horizon. Then $\mathcal{Z}_{go}$ is the (F−N)-step backward reachable set from $\{\xi^e: s^e \geq l\}$, the set of vehicle states that are past the intersection.

Conversely, if $F \leq N$, the ado vehicle 310 can enter the intersection during the current prediction horizon, and hence $\mathcal{Z}_{go} = \emptyset$. In this case, the control system 170 encodes the pointwise constraint $s_F^e$ in Equation (3e). Thus, $\mathcal{Z}_{go}(F)$ is expressed as:

$$\mathcal{Z}_{go}(F) = \begin{cases} B(\{\xi^e : s^e \geq l\}, F - N), & F > N \\ \emptyset, & \text{otherwise.} \end{cases} \quad \text{Equation (14)}$$

In one approach, $\mathcal{Z}_{go}(F)$ is computed offline for a range of F-values. Then online, F may be computed and $\mathcal{Z}_{go}(F)$ is retrieved. Furthermore, $\mathcal{Z}_{go}$ may rely on the monotonicity property of the control system 170. In other words, if the vehicle 100 can go before the ado vehicle 310 for the worst-case ado acceleration, then the vehicle 100 can also safely go through the intersection for milder ado acceleration. In one approach, the control system 170 removes the terminal constraint once the ado vehicle 310 has exited the intersection since the risk of contingency events have passed. Accordingly, the control system 170 improves safety and operator confidence through predictive control while an ADS is engaged by computing a nominal trajectory, a contingency trajectory, and through motion constraints to vehicle maneuvering.

Figure 4:
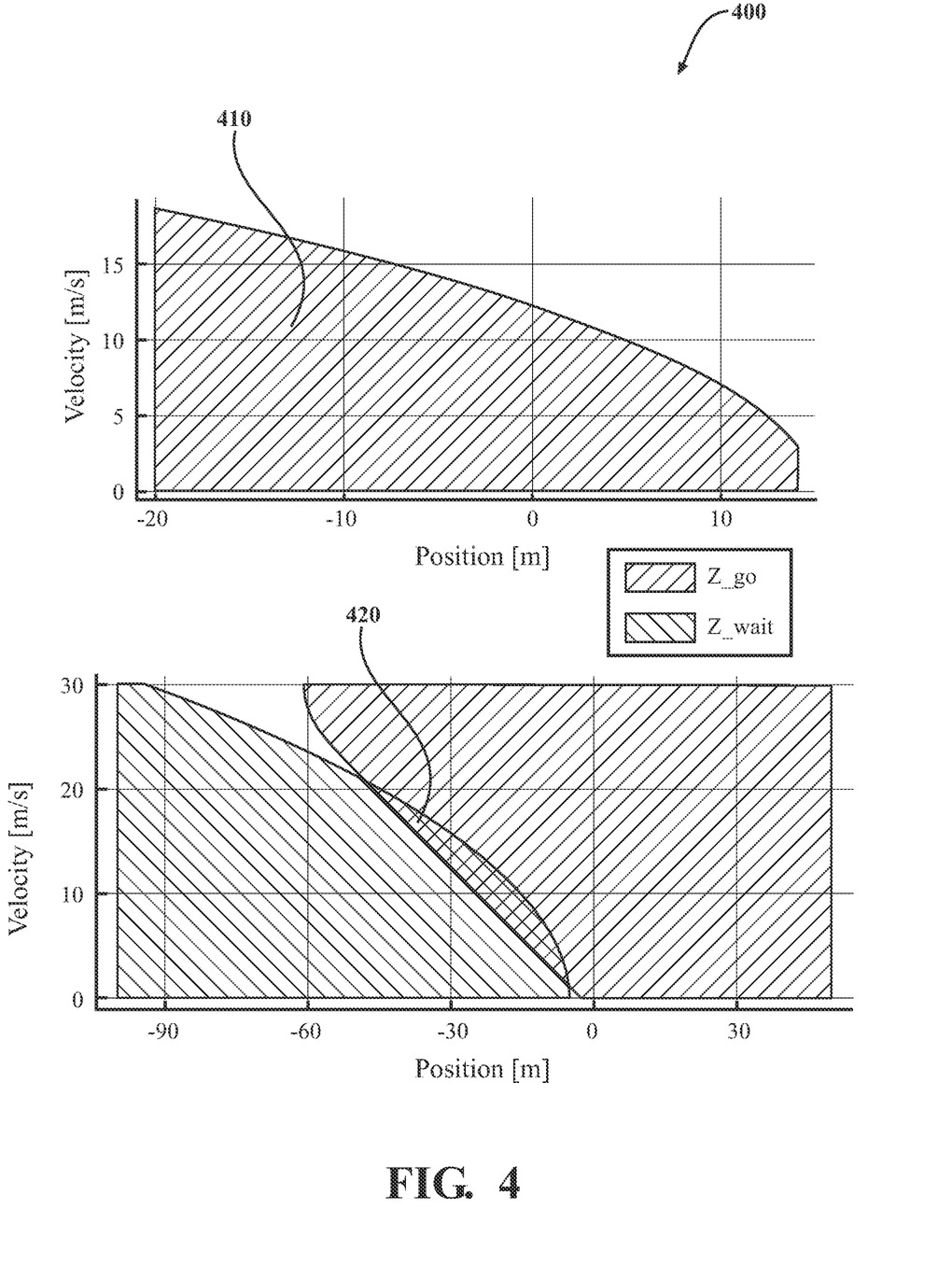
FIG. 4 illustrates an example of terminal sets associated with adjusting a motion command for a vehicle using predictive control and automated driving.

FIG. 4 illustrates an example of terminal sets 400 associated with adjusting a motion command for a vehicle using predictive control and automated driving. Chart 410 illustrates a terminal set for the vehicle-following state. Here, d=5 meters (m), N=14 and $\xi^a$=[10 m; 10 m/s]. In this hypothetical, the control system 170 can calculate $\xi^a$=[19:1 m; 3 m/s] and F=20. Chart 410 illustrates CMPC with the ADS engaged, allowing a higher velocity of the vehicle 100 when further away from the ado vehicle 310, where position 0 represents a reference point. Regarding chart 420, a terminal set for the intersection state 320 is given. Here, the terminal sets are $\mathcal{Z}_{wait}$ and $\mathcal{Z}_{go}(F)$, where F=27 and N=5. Similar to the vehicle-following state, the control system 170 controls the velocity of the vehicle 100 for $\mathcal{Z}_{go}$ or $\mathcal{Z}_{wait}$ according to the position from the ado vehicle 310. As such, the control system 170 uses a terminal set at a timestep in chart 410 or 420 that depends on the state of the vehicle 100 and/or environment, such as the position/velocity of the ado vehicle 310. In one approach, the vehicle 100 may use a slice, section, or portion of a terminal set that was computed offline.

Figure 5:
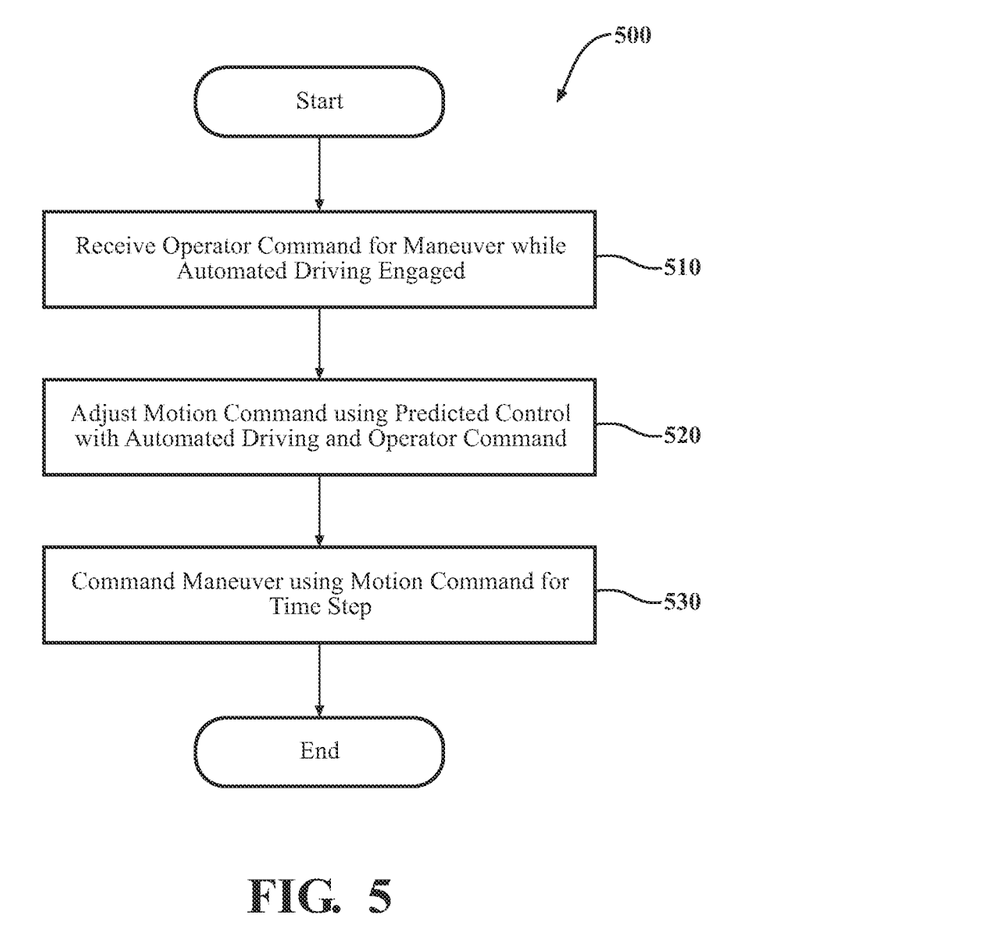
FIG. 5 illustrates one embodiment of a method that is associated with adjusting a motion command to execute a vehicle maneuver using predictive control with automated driving and contingency planning.

Now turning to FIG. 5, a flowchart of a method 500 that is related to using predictive control with automated driving and contingency planning is illustrated. Method 500 will be discussed from the perspective of the control system 170 of FIGS. 1 and 2. While method 500 is discussed in combination with the control system 170, it should be appreciated that the method 500 is not limited to being implemented within the control system 170 but is instead one example of a system that may implement the method 500.

At 510, the control system 170 receives an operator command for a maneuver while automated driving is engaged. For example, the vehicle 100 is operating using an ADS with shared control activated. In this mode, the control system 170 and the operator share control tasks (e.g., braking, steering, etc.) for the vehicle 100. As previously explained, the control system 170 uses contingency planning within predictive control for various ADS modes such that the operator feels in control of the vehicle 100, thereby improving comfort. In one approach, as previously explained, this involves the construction of terminal sets as constraints that ensure persistent feasibility for safety margins (e.g., a defined separation, intersection position, etc.). For example, the invariant terminal sets 240 represent motion constraints related to a vehicle state (e.g., crossing an intersection, vehicle-following, etc.) at time t. As such, the vehicle 100 can use a terminal set between multiple time steps of execution from predictive control to maintain smoothness and safety.

At step 520, the control system 170 through the prediction module 220 adjusts a motion command using the predictive control within the ADS and the operator command. Here, in one approach, the control system 170 executes contingency planning through the ADS so that the safety margin is maintained while respecting operator commands and moderating conservatism. The safety margin may relate to a contingency event (e.g., a rear-end, cross-traffic collision, etc.) and a breach of the safety margin triggers a safety maneuver (e.g., lateral maneuver, emergency braking, etc.) by the vehicle 100.

In one approach, the control system 170 uses contingency planning with predictive control such that a solution to a modeled problem involving a scenario for the vehicle 100 preserves the safety margin for a trajectory. As such, the control system 170 may compute the nominal trajectory 330 and the contingency trajectory 340 according to the operator command and adjust a motion command accordingly. In particular, the contingency trajectory 340 assumes that the contingency event takes place as a constraint for the model and may involve likely ADS intervention with a maneuver. On the contrary, the nominal trajectory assumes that the contingency event does not take place, thereby resembling a trajectory similar to following the operator command. In addition, the control system 170 coordinates the predictive control with the ADS to adjust the motion command for improved smoothness and moderated intervention of the vehicle 100.

The vehicle 100 may follow the nominal trajectory 330, that represents mostly continuing a maneuver, while a safety margin with the ado vehicle 310 is maintained. However, the vehicle 100 executes a motion command to follow the contingency trajectory 340 when a safety margin breach is projected. In one approach, the vehicle 100 uses the sensor data 250 to determine that the ado vehicle 310 will breach the safety margin, such as by sudden braking representing a contingency event. In this way, the vehicle 100 may avoid a dangerous scenario with the ado vehicle 310 through the contingency trajectory 340.

As previously explained, the control system 170 may utilize a cost function and vary $P_c$ and N to optimize an intervention for the predictive control. When the cost function is minimal or effectively zero, the control system 170 may adjust the motion command to approximately equal the operator command. The motion command is then communicated as adjusted to a controller within the vehicle systems 140. In one approach, the control system 170 operates with a higher weight on the cost of the contingency trajectory 340 by increasing $P_c$, reflecting that a contingency event may be likely. As a result, the control system 170 takes preventative action sooner that prevents abrupt interventions further along the contingency trajectory 340.

Accordingly, the control system 170 optimizes a trade-off between smooth intervention when the contingency event occurs and minimal controller intervention when the contingency event does not occur. In one approach, smooth intervention involves avoiding abrupt maneuvers such as hard braking or sudden lateral movement by the control system 170. As previously explained, when $P_c$=0 few terms in the cost function exist for the controller to take preventative action and smooth the intervention. For this $P_c$ value, the controller waits a maximum time before intervening and then intervenes most abruptly. In other words, the cost of smooth intervention may occur when the contingency event does not occur. Thus, the control system 170 can optimize maneuvers of the vehicle 100 with the ADS engaged by tuning the parameter $P_c$ based on the likelihood of the contingency event occurring and the preferences of an operator.

Furthermore, intervention can also be adjusted by increasing N. This causes the control system 170 to intervene sooner for predicted inputs that are unsafe, thereby avoiding abrupt and high-cost deviations from the operator command. For the case N=1, the control system 170 executes the operator command or nearest motion command with limited adjustments as safety margins are met through various scenarios. Here, the control system 170 smoothens future intervention through limited preventive action.

At 530, the control system 170 controls the maneuver using the motion command for the time step as adjusted. For example, the control system 170 communicates the motion command to a controller within the vehicle systems 140. In one approach, a maneuver by the vehicle 100 may continue a current trajectory, adjust to the nominal trajectory 330, or follow the contingent trajectory 340 to avoid a contingent event. Furthermore, continuing the current trajectory may involve the vehicle 100 effectively executing the original operator command. Accordingly, the control system 170 improves comfort, safety, and operator confidence in an ADS through predictive control while the ADS is engaged by adjusting the motion command in a way that avoids conservative control.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the control system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the control system 170, and/or the automated driving module(s) 160 may control some or all of the vehicle systems 140 and, thus, may be partially or fully autonomous as defined by the society of automotive engineers (SAE) levels 0 to 5.

The processor(s) 110, the control system 170, and/or the automated driving module(s) 160 can be operatively connected to communicate with the various vehicle systems 140 and/or individual components thereof. For example, returning to FIG. 1, the processor(s) 110, the control system 170, and/or the automated driving module(s) 160 can be in communication to send and/or receive information from the various vehicle systems 140 to control the movement of the vehicle 100. The processor(s) 110, the control system 170, and/or the automated driving module(s) 160 may control some or all of the vehicle systems 140.

The processor(s) 110, the control system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the control system 170, and/or the automated driving module(s) 160 can control the direction and/or speed of the vehicle 100. The processor (s) 110, the control system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the control system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A control system for improving maneuvering of a vehicle, comprising:
a processor; and
a memory storing instructions that, when executed by the processor, cause the processor to:
receive, by a controller, an operator command associated with a vehicle maneuver while automated driving is engaged;
adjust a motion command associated with the vehicle maneuver by applying a predictive control according to motion estimates outputted from the automated driving and the operator command and factoring manual control for the vehicle maneuver using a cost function, the predictive control using motion constraints that are constant between time intervals for the vehicle maneuver and the cost function includes weighted deviations from the operator command and predicted trajectories associated with the motion command; and
control, by the controller, the vehicle using the motion command for a time step during the time intervals.

2. The control system of claim 1, further including instructions that when executed by the processor cause the processor to determine a nominal trajectory and a contingency trajectory for the vehicle maneuver by applying the predictive control using a model with the motion estimates, wherein the nominal trajectory is associated with predicted inputs from an operator for the vehicle maneuver using the motion estimates from the automated driving and the contingency trajectory is associated with the predicted inputs and actions by surrounding vehicles.

3. The control system of claim 2, wherein the actions include braking or acceleration that decreases a safety margin of the vehicle maneuver and the contingency trajectory increases the safety margin of the vehicle maneuver.

4. The control system of claim 2, wherein the motion command adopts the operator command when the vehicle maneuver meets a safety margin in the model.

5. The control system of claim 2, wherein the nominal trajectory is equivalent to the contingency trajectory when a safety margin is satisfied in the model.

6. The control system of claim 2, further including instructions that when executed by the processor cause the processor to control the vehicle maneuver according to the contingency trajectory by the automated driving in a response to a safety margin being unmet.

7. The control system of claim 1, further including instructions that when executed by the processor cause the processor to prioritize, by a model, the manual control by an operator for the vehicle maneuver according to the cost function that is a sum of the weighted deviations from the operator command and the predicted trajectories from the automated driving associated with the motion command.

8. The control system of claim 1, wherein the instructions to adjust the motion command further include instructions to maintain, by a model, a safe trajectory with the vehicle maneuver according to the operator command and a predicted command.

9. The control system of claim 1, wherein the motion constraints are associated with the vehicle having a safe trajectory below a set speed when approaching an intersection and the motion command is used during shared control of the automated driving.

10. A non-transitory computer-readable medium comprising:
instructions that when executed by a processor cause the processor to:
receive, by a controller, an operator command associated with a vehicle maneuver while automated driving is engaged;
adjust a motion command associated with the vehicle maneuver by applying a predictive control according to motion estimates outputted from the automated driving and the operator command and factoring manual control for the vehicle maneuver using a cost function, the predictive control using motion constraints that are constant between time intervals for the vehicle maneuver and the cost function includes weighted deviations from the operator command and predicted trajectories associated with the motion command; and
control, by the controller, a vehicle using the motion command for a time step during the time intervals.

11. The non-transitory computer-readable medium of claim 10, further including instructions that when executed by the processor cause the processor to determine a nominal trajectory and a contingency trajectory for the vehicle maneuver by applying the predictive control using a model with the motion estimates, wherein the nominal trajectory is associated with predicted inputs from an operator for the vehicle maneuver using the motion estimates from the automated driving and the contingency trajectory is associated with the predicted inputs and actions by surrounding vehicles.

12. A method comprising:
receiving, by a controller, an operator command associated with a vehicle maneuver while automated driving is engaged;
adjusting a motion command associated with the vehicle maneuver by applying a predictive control according to motion estimates outputted from the automated driving and the operator command and factoring manual control for the vehicle maneuver using a cost function, the predictive control using motion constraints that are constant between time intervals for the vehicle maneuver and the cost function includes weighted deviations from the operator command and predicted trajectories associated with the motion command; and
controlling, by the controller, a vehicle using the motion command for a time step during the time intervals.

13. The method of claim 12, further comprising determining a nominal trajectory and a contingency trajectory for the vehicle maneuver by applying the predictive control using a model with the motion estimates, wherein the nominal trajectory is associated with predicted inputs from an operator for the vehicle maneuver using the motion estimates from the automated driving and the contingency trajectory is associated with the predicted inputs and actions by surrounding vehicles.

14. The method of claim 13, wherein the actions include braking or acceleration that decreases a safety margin of the vehicle maneuver and the contingency trajectory increases the safety margin of the vehicle maneuver.

15. The method of claim 13, wherein the motion command adopts the operator command when the vehicle maneuver meets a safety margin in the model.

16. The method of claim 13, wherein the nominal trajectory is equivalent to the contingency trajectory when a safety margin is satisfied in the model.

17. The method of claim 13, further comprising controlling the vehicle maneuver according to the contingency trajectory by the automated driving in response to determining that a safety margin is unmet.

18. The method of claim 12, further comprising prioritizing, by a model, the manual control by an operator for the vehicle maneuver according to the cost function that is a sum of the weighted deviations from the operator command and the predicted trajectories from the automated driving associated with the motion command.

19. The method of claim 12, wherein adjusting the motion command further includes maintaining, by a model, a safe trajectory with the vehicle maneuver according to the operator command and a predicted command.

20. The method of claim 12, wherein the motion constraints are associated with the vehicle having a safe trajectory below a set speed when approaching an intersection and the motion command is used during shared control of the automated driving.

* * * * *